Aug. 8, 1933.  E. S. CARPENTER  1,920,969

MECHANICAL MOVEMENT

Filed April 27, 1932  2 Sheets-Sheet 1

Inventor
Ernest S. Carpenter,
By Bates, Goldrick & Tear
Attorneys

Aug. 8, 1933.   E. S. CARPENTER   1,920,969
MECHANICAL MOVEMENT
Filed April 27, 1932   2 Sheets-Sheet 2
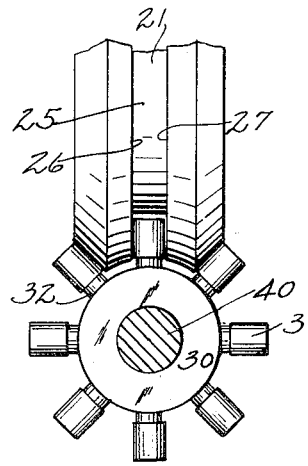
FIG. 4
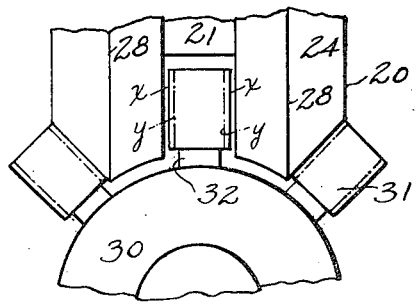
FIG. 6
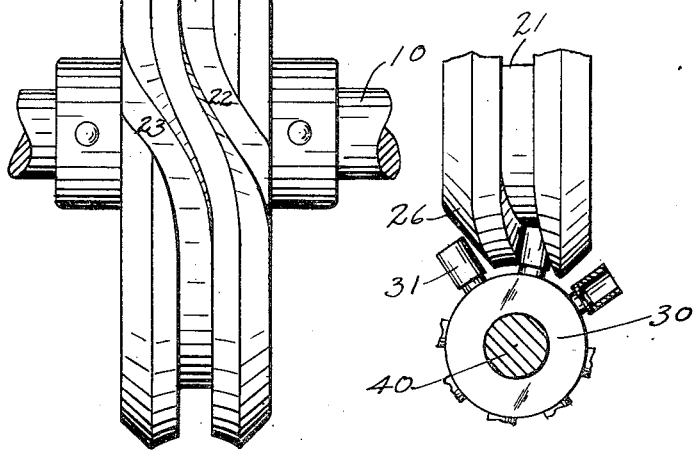
FIG. 5
FIG. 3
Inventor
Ernest S. Carpenter,
By Bates, Golrick & Hearn,
Attorneys Patented Aug. 8, 1933

1,920,969

UNITED STATES PATENT OFFICE 1,920,969

MECHANICAL MOVEMENT

Ernest S. Carpenter, Cleveland Heights, Ohio, assignor to The Augustus-Carpenter Company, Cleveland, Ohio, a Corporation of Ohio Application April 27, 1932. Serial No. 607,700

10 Claims. (Cl. 74—41)

This invention relates to a mechanical movement adapted to deliver intermittent rotation to a driven shaft from a continuously rotating driving shaft. The primary object of the invention is to provide a device for this purpose of such construction that the driving member may be rapidly rotated and the driven member given its step-by-step movement without jerk or irregularity, and where the driven member will be positively and accurately held against movement during the intervals between steps. Another feature of the invention is the provision of such a mechanism in a form which may be accurately adjusted, both for original setting and to compensate for subsequent wear.

My mechanical movement is well adapted for use in a motion picture projector for progressing the film; and in such use, the driving shaft—which also carries the shutter—must operate at a rapid speed, and the driven shaft must be very effectively locked during the periods of rest to prevent blurring the picture. It is also necessary that the device operate quietly; and it is important that it be compact and simple, to enable its satisfactory use in a projector of the household type.

My invention embodies the well-known principle of a circular driving cam having a peripheral groove making a nearly complete circumference, but having its ends diverted to the opposite sides of the cam, and a driven wheel having a series of radial pins, one of which occupies the groove while the adjacent pins on either side coact with the edges of the cam wheel. In my invention, I have refined this principle to effect the result of a more firm locking of the driven wheel for the greater portion of the time; a more steady movement of it during its period of turning, and provision for accurately setting the driven wheel with reference to the driving cam and readjusting such setting as wear may develop. I have arrived at this result by a large amount of trial and experimentation, and have produced a device which has been demonstrated to be very satisfactory in practice.

My invention may be said to consist of the means by which I accomplish the above outlined results, as illustrated in the drawings hereof and as hereinafter more fully explained and as summarized in the claims.

In the drawings:

Fig. 3 is an edge view of the cam or driving member of my mechanical movement.

Fig. 4 is an end view of the driven member and a portion of the cam in the position they occupy during the period when the driven member is locked.

Fig. 5 is a similar view illustrating the driven member in the act of being moved.

Fig. 6 is an exaggerated diagram illustrating how the wear may take place on the pins of the driven member and how the adjustment of the same may compensate for such wear.

Figure 1:
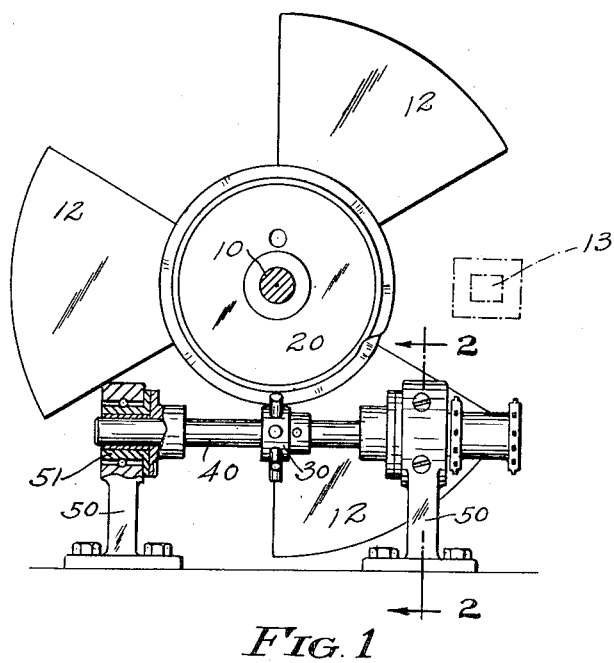
Fig. 1 is an end elevation of my invention embodied in an intermittent film drive for a motion picture projector.
Figure 2:
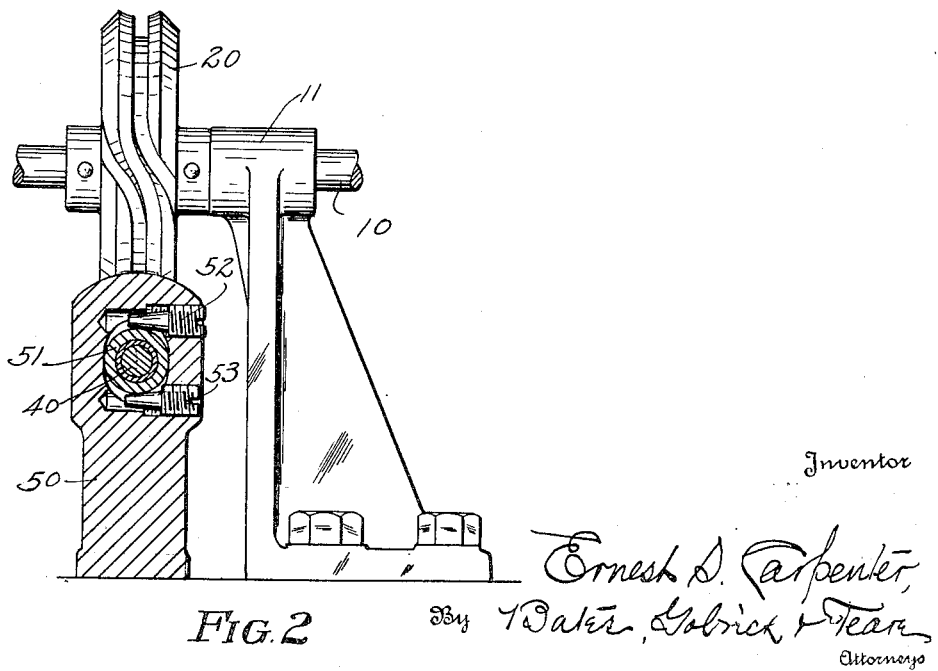
Fig. 2 is a vertical section of the same on the line 2—2 on Fig. 1.

In Figs. 1, 2 and 3, 10 indicates the driving shaft shown as mounted in a suitable bearing 11 and carrying the shutter 12 which periodically interrupts the rays of light from the lamp (not shown) to the frame opening 13 across which the film travels. On this shaft 10 is rigidly mounted the cam 20 which constitutes the driving member of my mechanical movement. This driving member has formed in its edge a peripheral groove 21 extending for nearly a complete circumference; but then gradually diverting at one end (as at 22) to the right-hand edge of the wheel, and at the other end of the wheel (as at 23) to the left-hand edge. The periphery is chamfered on each side, as shown at 24. The cam is otherwise specifically formed with reference to the result to be accomplished, as hereinafter explained.

The driven member of my mechanical movement comprises a wheel 30 having radial pins 31, any one of which may occupy the groove of the driving cam, while the adjacent pins on opposite sides during the period of rest engage the chamfered edges 24 of the cam. During the period of movement of the driven wheel, the pin which was in the straight groove 21, passes out through the diverted portion, as 22, for example, while another pin comes into the groove through the other diverted portion, as 23. The special construction of this driven wheel will also be fully described hereinafter.

The driven wheel is rigidly mounted on a shaft 40 which it drives. This shaft is suitably carried (as hereinafter explained) in bearing standards 50. It is shown as having secured to it two sprocket wheels 41 to engage the film and feed it intermittently across the frame opening 13. It will be seen that the mechanism moves the film only at a time when the shutter interrupts the light to the film.

The mounting of the shaft 40 is peculiar in that it is journalled primarily in bushings 51 which are flattened on their opposite vertical sides to lie within vertical-sided recesses in the standards 50. Each bushing is adapted to be adjusted up or down by means of a pair of pins 52 and 53 which are screw-threaded into the standard 50, and having tapered inner ends bearing against the highest and lowest portions of the bushing. By screwing out one of these pins and screwing in the other, the bushing is thus adjusted up or down, as desired; while when both pins are tightened, it is firmly locked in position. The pins 52 and 53 fit tightly enough in the standard so that they retain whatever position may be given them. This provides for a very accurate adjustment of the shaft 40 toward or from the cam and the locking of the shaft in selected position to maintain the driven wheel properly presented to the cam.

Reverting now to the driving cam 20, it will be seen that the groove 21 for the most part has a cylindrical or flat bottom 25 (Fig. 4) and side walls 26 and 27 which are in planes at right angles to the bottom surface; thus producing a parallel-sided groove except at the entrance and exit portions thereof. At the latter portions the side walls of the groove are warped in correspondence with the movement of the driven pins as they pass out of one end of the groove and into the other. The chamfers 24 of the edges of the cam wheel are at right angles to each other, in the embodiment shown, and between the two crown lines 28 provided by these chamfers the periphery of the wheel is dished, as shown at 29, to produce a concave surface, the contour of which is the arc of a circle of greater diameter than the hub of the driven wheel.

The driven wheel has a cylindrical hub and radial pins which are preferably made hollow as indicated to reduce their inertia. In the embodiment shown, there are eight of these pins, so that the axes of alternate pins are at right angles to each other. The driven wheel bears such relation to the driving cam that its hub is at all times out of contact with the cam periphery 29; during the period of rest one pin freely occupies the groove 21, being out of snug contact with its side walls 26 and 27 and not touching its bottom surface 25, while the two pins respectively on opposite sides of that pin snugly engage the two chamfered edges 24 of the cam, as shown in Fig. 4.

It results from the construction described that during the periods of rest the driven wheel engages only with the chamfered edges 24 of the cam. The fine adjustment provided for the shaft 40 enables this engagement to be so snug and accurate that not the slightest movement is allowed to the driven wheel, thus holding the film perfectly stationary. At the same time, the smooth chamfered edge of the driving cam may pass readily across the pins which are snugly contacting with it.

Now, when the diverted portion 22 or 23 of the cam comes into coaction with the driven member, the whole situation changes. At that period, the two pins which were engaging the chamfered edges cease their locking action by reason of the openings in such edges, and the center pin which was idle in the groove 21 is now active, being engaged by the warped edge of one of the walls, as 26 in Fig. 5. The result is that the driven wheel is turned such fraction of a rotation as one pin bears to the total number of pins,—i. e. 45° in the embodiment shown. This movement brings one of the pins 31 which has been engaging the chamfered edges 24 into the central groove and brings the adjacent pin against such chamfer, while the pin which had occupied the groove now engages the chamfered edge on the other side of the cam.

It is important that the pins be cylindrical, or at least have their opposite most distant lines in the general plane of the pin wheel parallel with each other so that the pin occupying the groove may stand reasonably close to the walls of the groove and still be capable of adjustment therein toward or from the center of the cam wheel. It is also important that clearance be provided between the end of the pin and the bottom of the groove, and between the hub of the driven wheel and the concave portion of the cam to enable the desired adjustment between the two diagonal pins and the chamfered cam edges. These features appear clearly in Figs. 4 and 5.

As the parts wear, the pins 52 and 53 may be adjusted to maintain the proper snug connection of the two pins with the two chamfered edges of the cam illustrated in Fig. 4. Such wear is, of course, slight; but it is highly important to keep these parts in accurate engagement, as any looseness would be likely to vibrate the film and cause a blur in the projection. On the other hand, too tight an engagement would cause the parts to bind, throwing an undue load on the motor and causing rapid wear of the parts.

To enable the adjustment without causing the pins to bear inwardly on the ridges 28, 28 of the cam, I may recess each pin annularly slightly as illustrated in 32 so that after the pins have worn and the shaft 40 has been adjusted toward the cam, the pins will still engage only the chamfers 24 of the cam in the period of rest.

The matter of wear is further illustrated by the diagram in Fig. 6 where the wear is greatly exaggerated. In that diagram the line $x$ indicates the original outermost portions of the pin, whereas the line $y$ indicates the wear which may come on one side of it and the line $z$ on the opposite side. The line $y$, it will be seen, is farther from the line $x$ than is the line $z$, which is due to the fact that the machine is run in the forward direction more frequently than in the reverse; but, in either case, the wear does not go far enough toward the axis of the pin to reach the undercut region 32, so that no rough edge results which might react badly with the ridges 28 of the cam wheel.

It is desirable that the cam wheel be of some hard, light, durable material which may maintain a very smooth surface on the chamfered periphery. I have found it satisfactory to make the cam of a composition of phenolic condensation product reinforced by internal fabric, and indurated by pressure. Such product is very hard and smooth, at the same time tough and durable, and, when machined to give it the form shown in the drawings, accurately retains that shape for a long period of time, and does not warp due to the heat present in the projector.

The necessity for delicacy and accuracy in an intermittent feed for motion picture projectors is illustrated by the fact that I have noticeably improved the steadiness and quietness of operation by making the pins hollow; thus reducing their weight and consequent inertia, and the tendency of the driven device to be overthrown when it is turned from one position to the next. As the shutter must pass the frame opening at greater speed than the eye can detect, and the change in the position of the film must be made during a small portion of the rotation of the cam wheel on the shutter shaft, it will be seen that the cam wheel is necessarily rotating at high speed and considerable of a blow would be given to the driven wheel if there were any looseness. Hence, the provision for accurate adjustment of the driven wheel toward the driving cam is very important.

I claim:

1. A mechanical movement, comprising a rotary driving wheel having a peripheral groove making an incomplete circumference and diverted at its ends to opposite sides of the wheel respectively, said wheel having chamfered edges, and a driven wheel having a series of pins, any one of which is adapted to occupy the groove while the two adjacent pins on opposite sides thereof engage said chamfered edges during the period of rest of the driven wheel, said pins having their extreme opposite lines parallel with each other, and there being clearance between the hub of the driven wheel and the periphery of the driving wheel whereby said wheels may be properly set with reference to each other.

2. A mechanical movement comprising a cam having a peripheral groove extending for nearly a complete circumference and then being diverted at its ends to opposite sides of the wheel respectively, the sides of said groove, except at the diverted portions, being in parallel planes normal to the axis, and a driven member comprising a hub having a series of radial pins, any one of which occupies the groove of the cam, while the two pins on opposite sides thereof engage the edges of the cam, the pin in the groove being out of snug engagement therewith while the two adjacent pins snugly engage the cam edges during the period of rest of the driven wheel, and during the period of movement of the driven wheel the intermediate pin engages a diverging wall of the cam, while the two pins on opposite sides thereof are out of holding contact with the cam.

3. In a mechanical movement, the combination of a driving wheel having a peripheral groove parallel sided for a nearly complete circumference and then diverted at one end to one side of the wheel and the other end to the other side by warped surfaces, the edges of the wheel being chamfered and the portion between the ridges of the chamfers being concave, and a driven wheel comprising a hub having a series of radially projecting pins, said driven wheel being so related to the driving wheel in shape, size and position that one pin may occupy the groove without actively contacting therewith while the pins on opposite sides thereof contact with the chamfers of the driving wheel while the hub of the driven wheel is out of contact with the concave portion of the driving wheel, the pins having their extreme opposite lines parallel with each other so that the axes of the wheels may be adjusted toward each other without causing binding of the pin in the groove.

4. A mechanical movement, comprising a rotary cam having a peripheral groove making a partial circumference and diverted at its ends to opposite sides of the wheel respectively, and a driven wheel having a series of pins, any one of which is adapted to occupy the groove while the two adjacent pins on opposite sides thereof engage the cam edges during the period of rest of the pin wheel, said pins having their extreme opposite lines parallel with each other and there being clearance between the hub of the pin wheel and the periphery of the cam, and between the end of the pin in the groove and the base of the groove, and mechanism for varying the distance between the axes of the cam and pin wheel.

5. In a mechanical movement, the combination of a driving wheel having a groove in its periphery making a nearly complete circumference, the ends of the groove having portions gradually passing to the opposite sides of the wheel respectively, the edges of the wheel being chamfered and the part between the ridges of the chamfers and the groove being recessed, a driven wheel having radial cylindrical pins, any one of which may occupy the groove while the adjacent pins on the opposite sides engage the chamfers of the driving wheel, there being clearance between the hub of the driven wheel and the recessed portion of the cam and clearance between the end of the pin occupying the groove and the base of the groove, and means for adjusting the axis of the driven wheel toward the cam.

6. In a mechanical movement, the combination of a driving shaft, a wheel thereon having a peripheral groove parallel sided for a nearly complete circumference and then diverted at one end to one side of the wheel and the other end to the other side by warped surfaces, the edges of the wheel being chamfered and the portion between the ridges of the chamfers being concave, and a driven member comprising a shaft, a hub thereon, a series of radial pins projecting from the hub, the parts being so proportioned that any pin may occupy the groove without actively contacting therewith while the pins on opposite sides thereof contact with the chamfers of the driving wheel while the hub of the driven wheel is out of contact with the concave portion of the driving wheel, the pins having their extreme opposite lines parallel with each other so that the driven shaft may be adjusted toward the driving shaft without causing binding of the pin in the groove, and means for effecting such adjustment.

7. In a mechanical movement, the combination of a driving cam wheel having a peripheral groove which extends for an incomplete circumference and then has its ends diverted to opposite sides of the wheel, a driven wheel having a series of radial pins, one of said pins being adapted to occupy the groove, while pins on opposite sides thereof engage the edges of the cam wheel, the pins of the driven wheel being hollow to reduce their inertia.

8. In a mechanical movement, the combination of a driving cam wheel having a peripheral groove which extends for nearly a complete circumference and then has its ends diverted to opposite sides of the wheel, the wheel having its edges chamfered, a driven wheel having a series of radial pins all alike, one of said pins being adapted to occupy the groove, while pins on opposite sides thereof engage the chamfered edges of the driven wheel, the pins of the driven wheel being undercut adjacent the hub of such wheel to prevent contact with the ridges of the cam wheel when the worn parts are readjusted.

9. In a mechanical movement, the combination of a driving wheel having a groove in its periphery which makes an incomplete circumference and is then diverted at its ends to the opposite side of the wheel, a driven wheel having a series of pins, one of which may occupy the groove while the adjacent pins on opposite sides engage the edges of the driving wheel, a shaft carrying the driven wheel, a bearing for said shaft comprising a bushing embracing the shaft and slidably mounted in a standard, and pins movably mounted in the standard and having tapered portions engaging the top and bottom of the bushing.

10. In a mechanical movement, the combination of a driving shaft, a wheel thereon having a groove in its periphery which makes a nearly complete circumference and is then diverted at its ends to the opposite side of the wheel, the edges of the wheel being chamfered, a driven shaft at right angles to the driving shaft, a wheel on the driven shaft having a series of radial pins, any one of which may occupy said groove while the adjacent pins on opposite sides engage the chamfers of the wheel, bearings for said driven shaft, each comprising a bushing embracing the shaft and slidably mounted in a standard, and pins threaded in the standard and having tapered portions engaging the top and bottom of the bushing, whereby the driven wheel may be accurately set with reference to the driving wheel.

ERNEST S. CARPENTER.